(12) United States Patent
Avrahami et al.

(10) Patent No.: US 9,813,672 B2
(45) Date of Patent: Nov. 7, 2017

(54) SYSTEMS AND METHODS FOR CONVEYING PHYSICAL STATE OF A REMOTE DEVICE

(71) Applicant: FUJI XEROX CO., LTD., Tokyo (JP)

(72) Inventors: Daniel Avrahami, Mountain View, CA (US); Jacob Biehl, San Jose, CA (US); Anthony Dunnigan, Palo Alto, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/339,929

(22) Filed: Nov. 1, 2016

(65) Prior Publication Data

US 2017/0048493 A1  Feb. 16, 2017

Related U.S. Application Data

(62) Division of application No. 14/574,379, filed on Dec. 17, 2014, now Pat. No. 9,503,682.

(51) Int. Cl.
*H04N 7/14* (2006.01)
*H04N 7/15* (2006.01)

(52) U.S. Cl.
CPC ............ *H04N 7/157* (2013.01); *H04N 7/142* (2013.01); *H04N 7/147* (2013.01)

(58) Field of Classification Search
CPC ..................................................... H04N 7/14
USPC ................................ 348/14.01, 14.03, 14.07
See application file for complete search history.

(56) References Cited

U.S. PATENT DOCUMENTS

| 7,154,526 | B2 | 12/2006 | Foote | |
|---|---|---|---|---|
| 8,520,052 | B2 | 8/2013 | Venolia | |
| 8,717,447 | B2 | 5/2014 | Shuster | |
| 9,325,943 | B2* | 4/2016 | Wilson | H04N 7/157 |
| 9,584,766 | B2* | 2/2017 | Pradeep | H04N 7/144 |
| 2007/0040898 | A1* | 2/2007 | Lee | H04N 7/147 348/14.08 |
| 2012/0092438 | A1* | 4/2012 | Guzman Suarez | H04N 7/15 348/14.03 |
| 2012/0281059 | A1* | 11/2012 | Chou | H04N 7/15 348/14.07 |
| 2012/0320142 | A1* | 12/2012 | Baird | H04N 7/14 348/14.03 |
| 2013/0162749 | A1* | 6/2013 | Eskilsson | H04N 7/15 348/14.1 |

(Continued)

OTHER PUBLICATIONS

Harrison, C et al. Pseudo-3D Video Conferencing witn a Generic Webcam. In Proc. of 10th IEEE Int. Symp. on Multimedia (Berkeley CA Dec. 15-17, 2008) ISM '08 IEEE Wash. DC 236-241.

*Primary Examiner* — Olisa Anwah
(74) *Attorney, Agent, or Firm* — TransPacific Law Group; Pavel I. Pogodin, Esq.

(57) ABSTRACT

Described are systems and methods for helping a participant, who is represented in a remote space by a remote device, to understand the physical state of the remote device in the remote space. This is done through physical and virtual changes in their local space that reflect their own remote physical representation. For example, if their action in the local space causes the remote telepresence robot to rotate 90 degrees, their local display through which the control the robot might rotate 9 degrees. The described methods will help participants have a greater sense of presence in a remote space.

8 Claims, 9 Drawing Sheets

(56) References Cited

U.S. PATENT DOCUMENTS

| | | | | |
|---|---|---|---|---|
| 2014/0055551 A1* | 2/2014 | Hong | ................... | H04N 7/147 |
| | | | | 348/14.01 |
| 2014/0184721 A1* | 7/2014 | Zhang | ................... | H04N 7/15 |
| | | | | 348/14.02 |
| 2016/0073055 A1* | 3/2016 | Marsh | ................... | H04N 7/152 |
| | | | | 348/14.08 |
| 2016/0210998 A1* | 7/2016 | Leske | ................... | G06T 11/60 |

\* cited by examiner

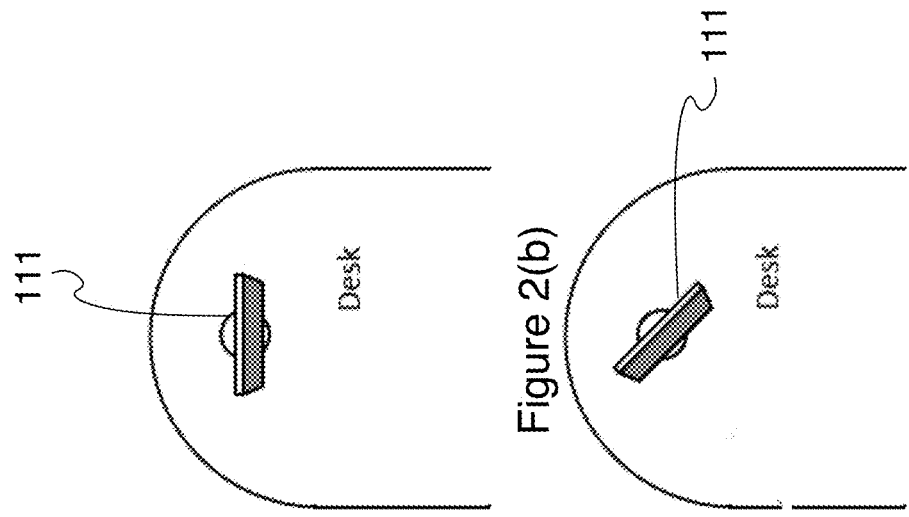
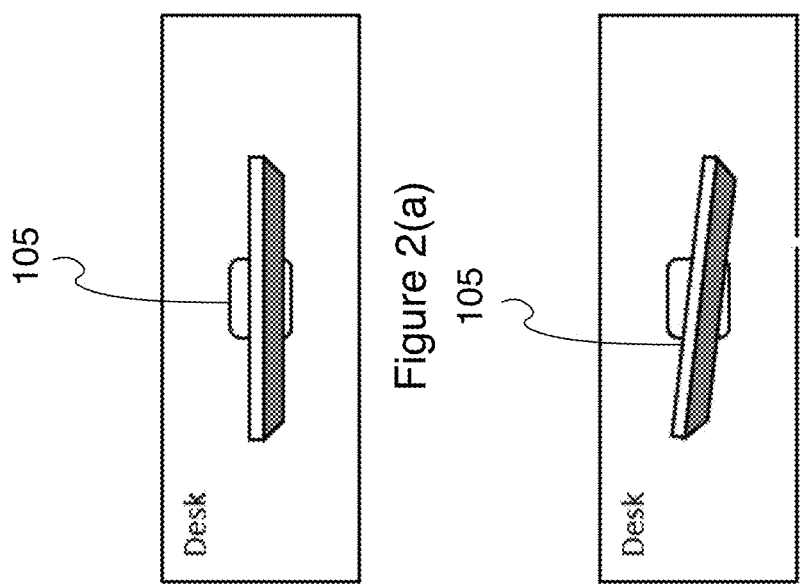

SYSTEMS AND METHODS FOR CONVEYING PHYSICAL STATE OF A REMOTE DEVICE

CROSS-REFERENCE TO RELATED APPLICATIONS

This patent application claims the benefit of priority of and is a divisional of U.S. patent application Ser. No. 14/574,379 filed on Dec. 17, 2014 (pending), the entire disclosure of which is incorporated by reference herein.

BACKGROUND OF THE INVENTION

Technical Field

The disclosed embodiments relate in general to video conferencing technology and, more specifically, to systems and methods for conveying physical state of a remote device.

Description of the Related Art

Supporting remote collaboration and allowing a participant to get a sense of presence in a remote space has been the focus of research and commercial systems. One solution that has been offered is to augment video conferencing by representing a remote participant through a device that can move (either as a full-size robot or as a desktop device). These solutions allow the remotely participating participant to look around the room, which results in such participant's improved ability to follow the conversation.

However, it has been shown that despite the ability to "move" and look around, participants participating in a conference remotely do not feel present in the remote space. It is likely that this is because they cannot experience the changes in their physical representation in the remote space.

As would be appreciated by those of skill in the art, in view of the aforesaid deficiencies of the conventional technology, new and improved systems and methods that provide remote participants with physical and/or virtual cues about the physical state of their remote reprsentation are needed.

SUMMARY OF THE INVENTION

The embodiments described herein are directed to methods and systems that substantially obviate one or more of the above and other problems associated with the conventional video conferencing solutions.

In accordance with one aspect of the inventive concepts described herein, there is provided a computer-implemented method being performed in a computerized system incorporating a processing unit, a display device, a network interface and a memory, the computer-implemented method involving: receiving, via the network interface, a video feed from a remote device disposed at a remote location; generating an avatar of the participant, the avatar of the participant representing participant's motion; overlaying the generated avatar of the participant over the received video feed; and displaying the received video feed with the overlaid avatar of the participant to the participant on the display device.

In one or more embodiments, the computerized system further incorporates a camera, the computer-implemented method further involves capturing a second video feed of the participant using the camera, wherein the avatar of the participant is generated using the second video feed.

In one or more embodiments, the method further involves removing background from the second video feed to obtain a silhouette of the participant, wherein the avatar of the participant is generated using the obtained silhouette of the participant.

In one or more embodiments, the generated avatar of the participant is overlaid over the received video feed to minimize occlusion of meaningful content.

Additional aspects related to the invention will be set forth in part in the description which follows, and in part will be obvious from the description, or may be learned by practice of the invention. Aspects of the invention may be realized and attained by means of the elements and combinations of various elements and aspects particularly pointed out in the following detailed description and the appended claims.

It is to be understood that both the foregoing and the following descriptions are exemplary and explanatory only and are not intended to limit the claimed invention or application thereof in any manner whatsoever.

BRIEF DESCRIPTION OF THE DRAWINGS

The accompanying drawings, which are incorporated in and constitute a part of this specification exemplify the embodiments of the present invention and, together with the description, serve to explain and illustrate principles of the inventive concepts. Specifically:

FIGS. 2(a), 2(b), 2(c) and 2(d) illustrate top down views of the changes (rotation) in the local and remote spaces in accordance with one embodiment described herein.

DETAILED DESCRIPTION

Figure 1:
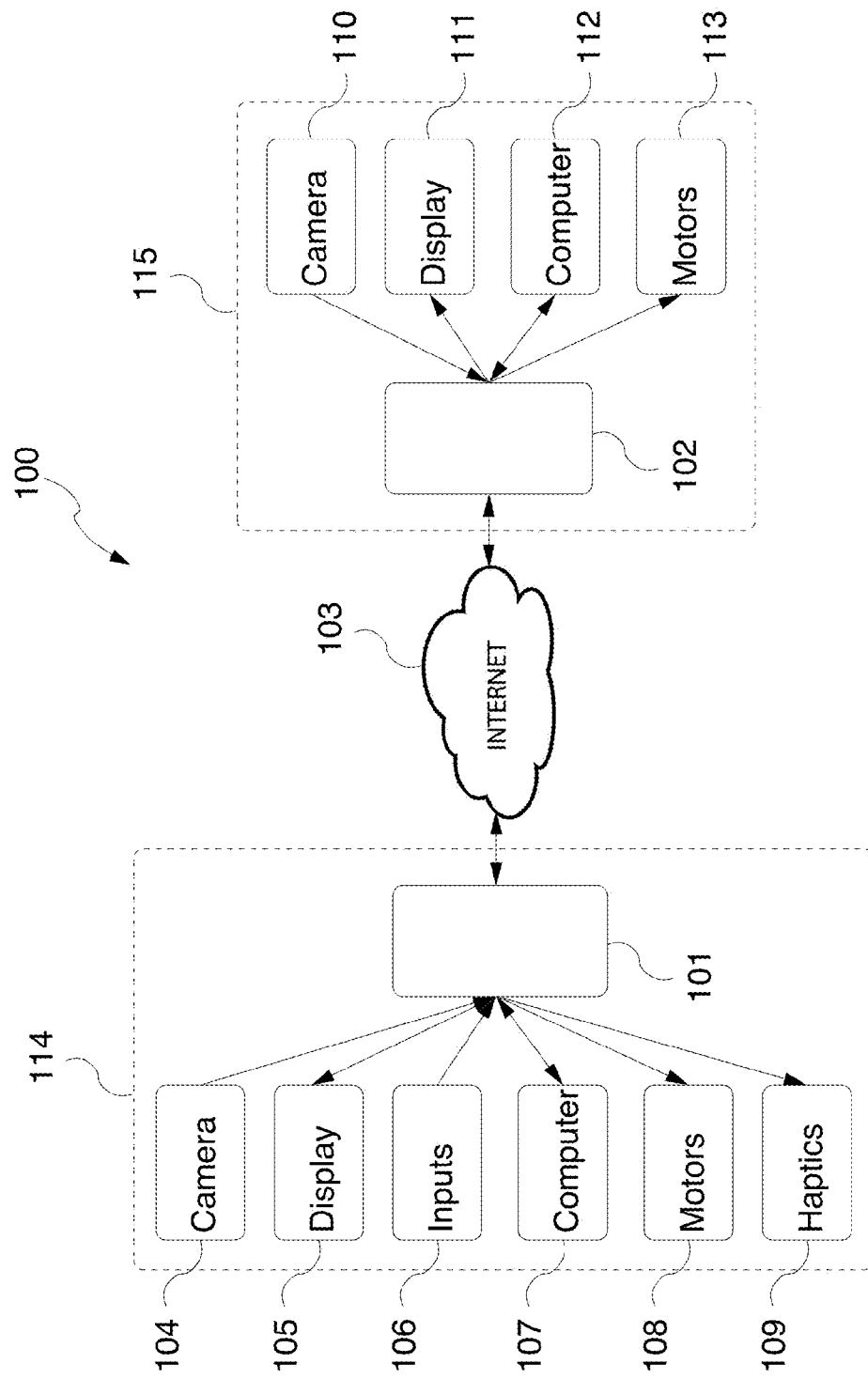
FIG. 1 illustrates an exemplary embodiment of a system architecture 100 that could be used in implementing concepts described herein.

In the following detailed description, reference will be made to the accompanying drawing(s), in which identical functional elements are designated with like numerals. The aforementioned accompanying drawings show by way of illustration, and not by way of limitation, specific embodiments and implementations consistent with principles of the present invention. These implementations are described in sufficient detail to enable those skilled in the art to practice the invention and it is to be understood that other implementations may be utilized and that structural changes and/or substitutions of various elements may be made without departing from the scope and spirit of present invention. The following detailed description is, therefore, not to be construed in a limited sense. Additionally, the various embodiments of the invention as described may be implemented in the form of a software running on a general purpose computer, in the form of a specialized hardware, or combination of software and hardware.

Conventional desktop telepresence devices are capable of moving a display and camera, with varying degrees of freedom, based on actions of a remote participant. In the aforesaid telepresence systems, when, for example, the participant clicks on the video, this causes the device to physically move in the remote space such that the point clicked is now in the center of the video. However, while the point-of-view of the video may change, the fact that the device has physically moved may be unclear to the participant, which may diminish participant's ability to experience presence.

To address the above and other problems associated with the conventional video conferencing technology, one or more embodiments described herein implement systems and methods for helping a participant, who is represented in a remote space by a representation agent, such as a remote device controlled by the participant, to understand the physical state of the aforesaid remote device in the remote space. This is accomplished through physical and virtual changes in their local space that reflect the physical state of the aforesaid remote device. Embodiments of the described systems and methods can be used to reflect the physical state of the remote device at the site of the remote participant. One exemplary embodiment described herein involves physical motion in the local space that represents (but is not identical to) the motion in the remote space. The terms move and motion as used in this disclosure shall be interpreted broadly to cover both the change of spatial position as well as change of orientation, which may involve changes in yaw, pitch and roll of the object.

Another embodiment involves warping the video window to suggest pitch and yaw changes in the remote space. Yet another embodiment generates a visual representation of the participant (an avatar), which is then overlaid on top of the view of the remote space. In connection with the embodiments described below, it is assumed that the main mode of utilization for the described system is with the participant seated in front of a system placed on a tabletop.

Exemplary Overall System Configuration

FIG. 1 illustrates an exemplary embodiment of a system architecture 100 that could be used in implementing concepts described herein. In one or more embodiments, the system architecture 100 includes various system components deployed at two physical locations: a first (also referred to herein as "local") location 114, such as videoconference participant's home, and a second (also referred to herein as "remote") location 115, such as a conference room. The data and commands are sent between the aforesaid two locations via Internet 103 by means of communication controllers (network interfaces) 101 and 102. In one or more embodiments, equipment at the first location 114 includes a camera 104 for capturing a video of the videoconference participant, a display device 105 for displaying a video from the camera 110 at the second location 115, inputs 106, such as a keyboard and a mouse, for receiving participant's input commands, a computer 107, motors or other actuators 108 for changing orientation of the display device 105 as well as haptic interface 109 for providing a haptic feedback to the participant. In one or more embodiments, the camera 104, the display device 105 and, optionally, the remaining components 101 and 106-109 may be combined together into a single telecommunication device.

In one or more embodiments, the equipment at the second location 115 (the "remote" conference room) may include a camera 110 for capturing a video of participants at the second location, a display device 111 for displaying video captured by the camera 104 at the first location, a computer 112 as well as motors or other actuators 113. In one or more embodiments, the camera 110, the display device 111 and, optionally, the remaining components 112 and 113 may be combined together into a single remote device, which may be used to represent the local participant in the remote space 115. The operation of specific components of the system architecture 100 will be described below in connection with specific embodiments.

Conveying Physical State Through Small-Magnitude Physical Motion

In a first exemplary embodiment, the display 105 (and, optionally, camera 104) at the first location 114 and the remote device including the display 111 and the camera 110 at the second location 115 are configured to be capable of physical movement by means of the motors/actuators 108 and the motors/actuators 113, respectively. However, as described below, the range of motion of the display 105 is significantly smaller than that of the remote device, because the motion of the display 105 is used primarily for participant awareness. In other words, in the first embodiment, when the remote device including the remote display device 111 and the camera 110 moves, the local display device 105 will also move, but with a smaller magnitude of motion. In one or more embodiments, the relationship of the motion of the remote display device 111 and the camera 110 and the local display device 105 may be non-linear.

FIGS. 2(a), 2(b), 2(c) and 2(d) illustrate top down views of the changes (rotation) in the local and remote spaces in accordance with one embodiment described herein. FIGS. 2(a) and 2(c) correspond to the rotation of the tabletop telecommunication device including the display 105 at the first location 114. FIGS. 2(b) and 2(d) correspond to the rotation of the remote device including the display 111 at the second location 115. In one embodiment, the remote display 111 rotates 45 degrees around the Z (vertical) axis, while the local display 105 will rotate 4.5 degrees along the same Z (vertical) axis. In other words, the local display rotates in the same direction but at a smaller magnitude of rotation to indicate the physical change of the remote device including the remote display 111, which rotates by higher amplitude.

Figure 3B:
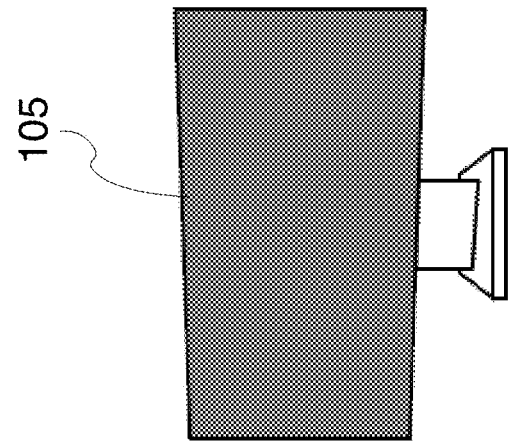
FIGS. 3(a) and 3(b) illustrate the same effect from the perspective of the participant located at the first location.
Figure 3A:
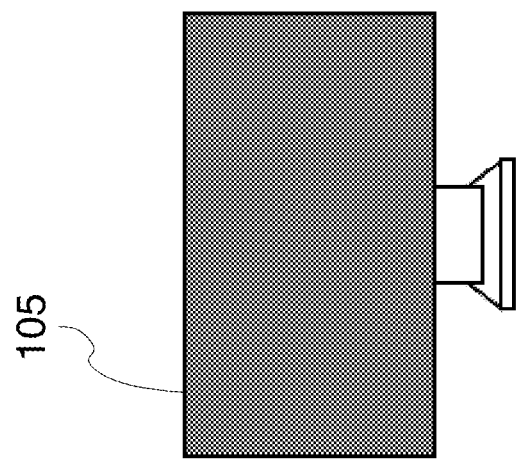

FIGS. 3(a) and 3(b) illustrate the same effect from the perspective of the participant located at the first location 114. As could be seen from FIGS. 3(a) and 3(b), the local display 105 rotates slightly to indicate the physical change occurring that the remote device including the remote display 111. This will allow the participant at the first location 114 to understand the motion happening in the remote (second) location 115, while still allowing the aforesaid participant to comfortably use the video conferencing system on his or her desk. In one or more embodiments, the videoconferencing system is configured to auto re-center the local display 105 after the rotation. The aforesaid re-centering involves the local display 105 to rotating back to the initial position shown in FIG. 3(a).

Figure 4:
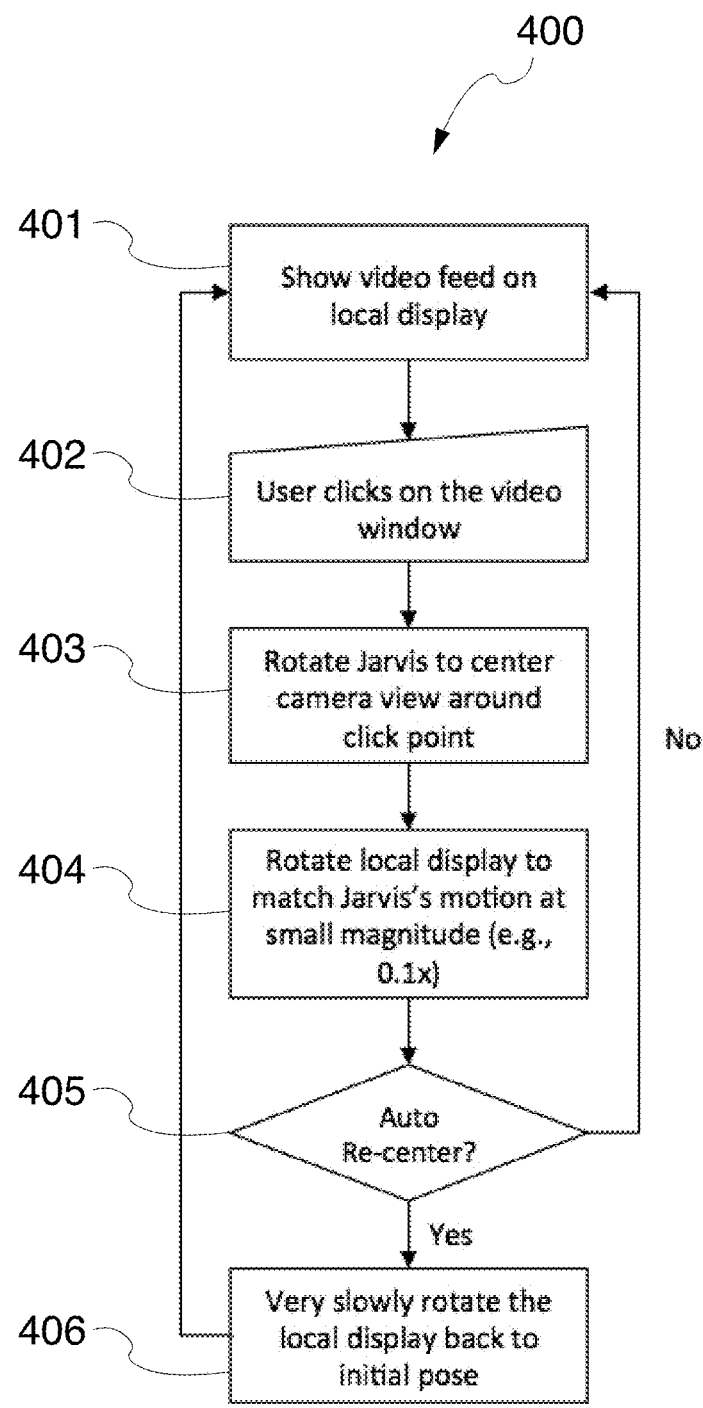
FIG. 4 illustrates an exemplary embodiment of an operating sequence of a system for conveying physical state through small-magnitude physical motion.

FIG. 4 illustrates an exemplary embodiment of an operating sequence 400 of a system for conveying physical state through small-magnitude physical motion. At step 401, the system shows the participant the video feed from the remote location 115 on the local display 105. At step 402, the system detects a participant event, such as participant's clicking mouse cursor at a location within video window, which corresponds to a location within the remote conference room 115. At step 403, the system rotates the remote device including the display 111 and the camera 110 to center the camera view at the location selected by the participant. At step 404, the local display 105 is rotated to represent the motion of the remote device including the remote display 111 and the camera 110, but at a smaller magnitude of rotation (e.g. one tenth of the rotation magnitude of the rotation of the remote display 111 and the camera 110). At step 405, if auto-re-center feature is enabled, the display 105 is slowly rotated to the initial position, see step 406, after which the operating sequence returns to the initial step 401. Otherwise, the operating sequence returns to step 401 without the display 105 being re-centered.

Conveying Physical State Through Small-Magnitude Manipulation of the Video Window In a second exemplary embodiment, changes to physical state of the remote device including the remote display 111 and the camera 110 are reflected by changing the shape of the bounding box of the video feed displayed to the participant on the display device 105 at the local location 114 as opposed to the actual motion of the display device 105, as in the first embodiment. This is performed in order to simulate three-dimensional rotation of the display device 105, but without requiring the system to be able to physically move the display 105.

Figure 5C:
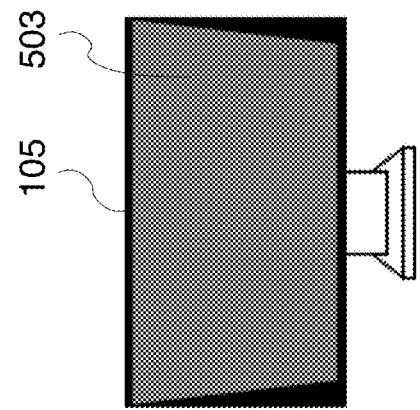
FIGS. 5(a), 5(b) and 5(c) illustrate changing the shape of the bounding box of the video feed to simulate the three-dimensional rotation of the display device.
Figure 5B:
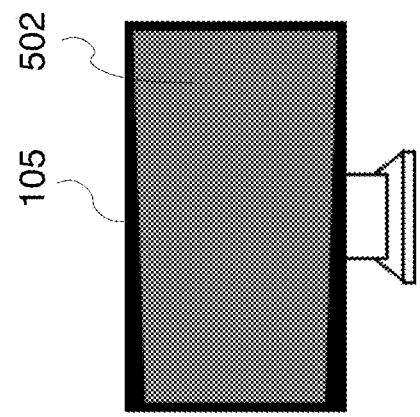
Figure 5A:
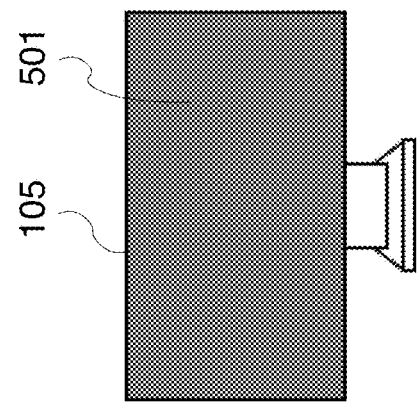

FIGS. 5(*a*), 5(*b*) and 5(*c*) illustrate changing the shape of the bounding box of the video feed to simulate the three-dimensional rotation of the display device 105. Specifically, FIG. 5(*a*) shows the original video feed 501. On the other hand, FIG. 5(*b*) corresponds to a video feed 502 with a simulated turn of the display 105 in the horizontal plane (around the Z (vertical) axis). Finally, FIG. 5(*c*) corresponds to a video feed 503 with a simulated turn of the display 105 in the vertical plane (around a horizontal axis). In other words, the rotation of the remote device including the display 111 and camera 110 is reflected through perspective deformation of the corresponding video feed.

Figure 6:
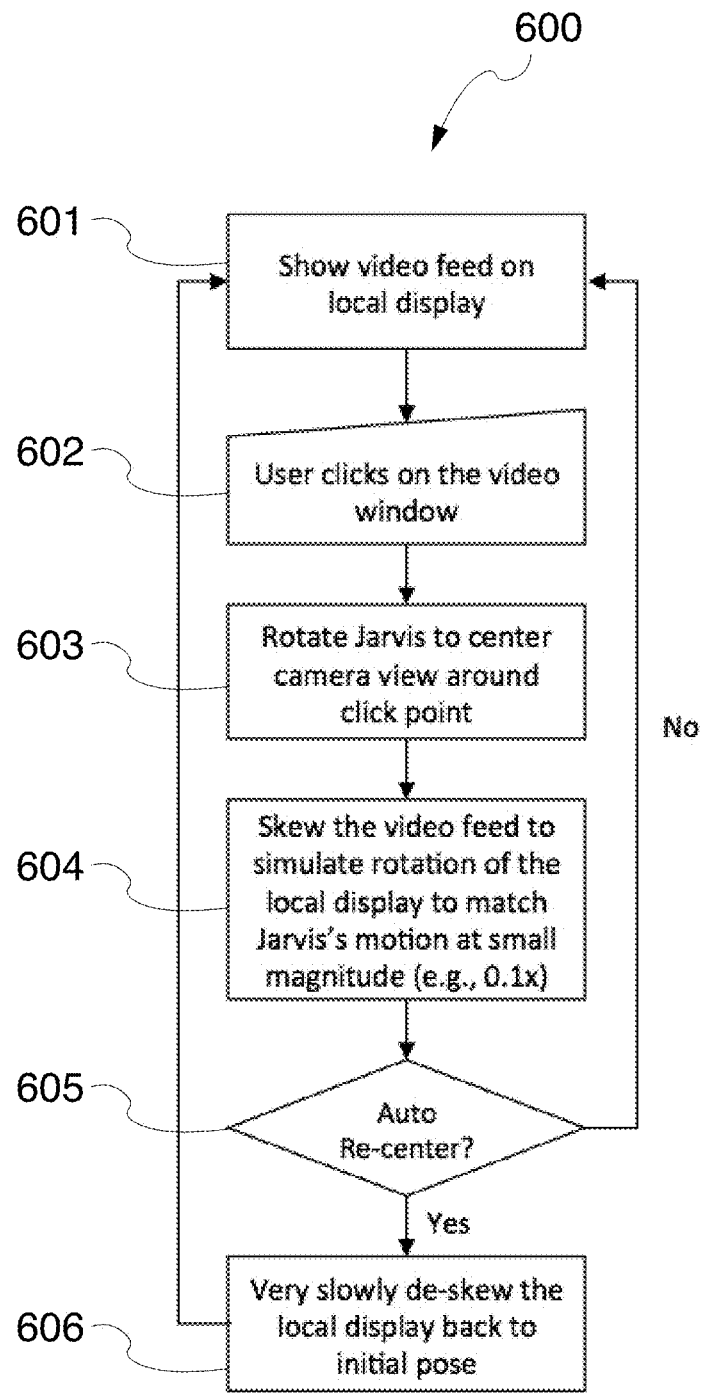
FIG. 6 illustrates an exemplary embodiment of an operating sequence of a system for conveying physical state through small-magnitude manipulation of the video window.

FIG. 6 illustrates an exemplary embodiment of an operating sequence 600 of a system for conveying physical state through small-magnitude manipulation of the video window. At step 601, the system shows the participant the video feed from the remote location 115 on the local display 105. At step 602, the system detects a participant event, such as participant's clicking mouse cursor at a location within video window, which corresponds to a location within the remote conference room 115. At step 603, the system rotates the remote device including the display 111 and the camera 110 to center the camera view at the location selected by the participant. At step 604, the video feed shown on the local display 105 is skewed to simulate rotation of the local display 105 to represent the motion of the remote device including the remote display 111 and the camera 110, but at a smaller magnitude of simulated rotation (e.g. one tenth of the rotation magnitude of the rotation of the remote device including the remote display 111 and the camera 110). At step 605, if auto-re-center feature is enabled, the display 105 is slowly de-skewed to the initial state, see step 606, after which the operating sequence returns to the initial step 601. Otherwise, the operating sequence returns to step 601 without the display 105 being de-skewed.

In one or more embodiments, at the aforesaid step 606, following a motion or virtual manipulation of the video feed, the local display system 105 will return to its "rest" state (for example, with the display parallel to the participant) in a very gradual, almost imperceptible way (for example, over the course of 10 seconds). This is accomplished without the associated motion of the remote device including the display 111 and camera 110 in the remote space 115. In addition, the videoconferencing system may provide haptic feedback to the participant using the haptic devices 109 shown in FIG. 1.

Overlaying Participant's Avatar onto View of Remote Scene

In a third exemplary embodiment, the described video conferencing system provides a participant with a direct feedback about how the participant appears in distant physical spaces by overlaying an animated avatar of the participant onto a video feed representing participant's view of the remote scene 115. This video feed is displayed to the participant on the display device 105. In one or more embodiments, the aforesaid participant avatars are generated by manipulating the outgoing video stream captured by the camera 104. In one or more embodiments, the avatar aligns in real time with the motions of the participant (e.g. when the participant raises their hand, the avatar raises its hand).

In one embodiment, a silhouette of the participant is used for generating the aforesaid participant's avatar, which is obtained by removing the background from participant's outgoing video stream captured by the camera 104. In one embodiment, this is accomplished with the assistance of a separate sensor, such as an active-stereo camera or passive-stereo camera, well known to participants of ordinary skill in the art. Additionally or alternatively, information about the participant's pose can be inferred from the same data and used to create a fully synthetic avatar. In either case, the resulting animated imagery is overlaid onto the participant's view of the meeting (of the remote space 115) shown to the participant on the display 105. This arrangement is optimized to convey participant's presence without occluding important elements in the scene.

Figure 7:
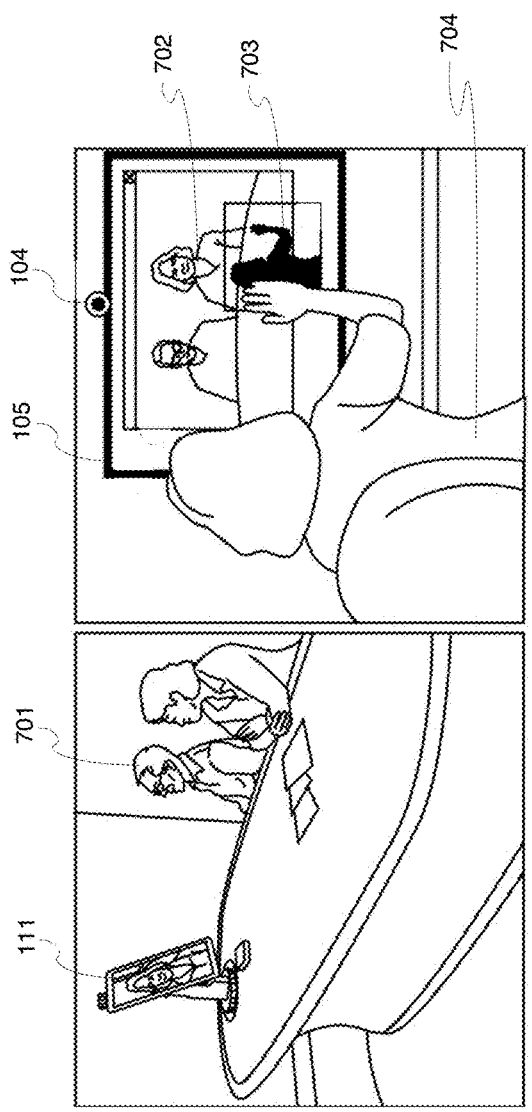
FIGS. 7(a) and 7(b) illustrate exemplary participant's view of the video feed from the remote location displayed to the participant on the display device 105 with overlaid participant's avatar.

FIGS. 7(*a*) and 7(*b*) illustrate exemplary participant's view of the video feed from the remote location 115 displayed to the participant on the display device 105 with overlaid participant's avatar. These figures depict a local participant 704 connecting to a remote meeting with participants 701 via a tabletop telecommunication device comprising the display device 105 and the camera 104. The camera 104 is used to capture local participant's 704 outgoing video stream, which is shown to the remote participants 701 using the display device 111. In the shown embodiment, this outgoing video stream is used to generate participant's avatar 703, which is overlaid over the video feed 702 displayed to the participant using the display device 105. The participant's avatar 703 is positioned towards the bottom and to the right side of the video feed 702 to minimize the occlusion of the shown content. The participant's avatar 703 conveys to the local participant 704 the participant's presence in the remote scene 115.

Figure 8:
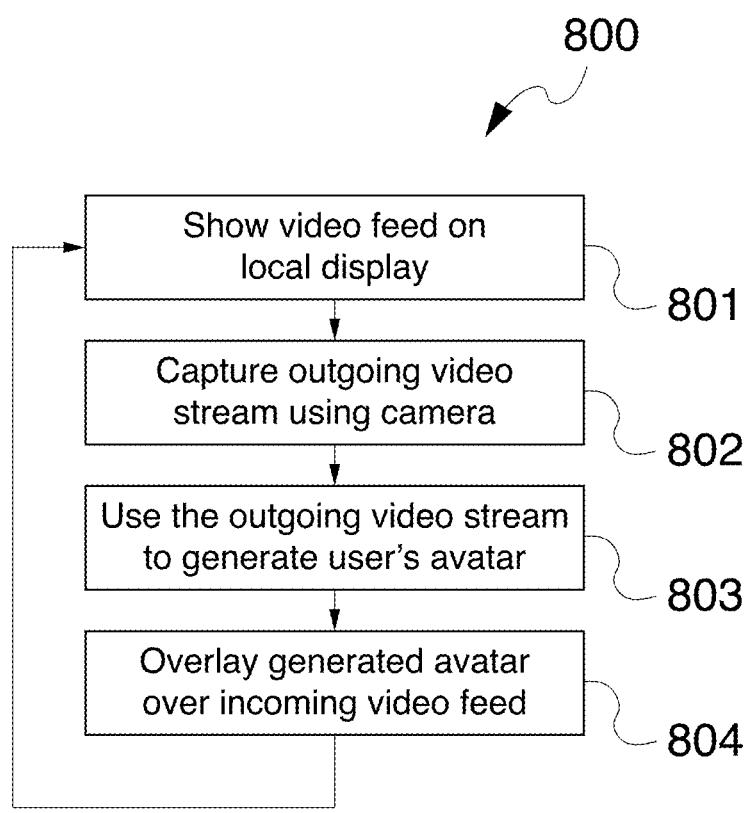
FIG. 8 illustrates an exemplary embodiment of an operating sequence of a system for overlaying participant's avatar onto view of remote scene.

FIG. 8 illustrates an exemplary embodiment of an operating sequence 800 of a system for overlaying participant's avatar onto view of remote scene. At step 801, the system shows the participant the (incoming) video feed from the remote location 115 on the local display 105. At step 802, the system captures the outgoing video feed using local camera 104. At step 803, the system uses the captured outgoing video feed to generate participant's avatar. In various embodiments, this could be done by removing background from the captured outgoing video feed or by generating a fully synthetic avatar. At step 804, the generated avatar is overlaid over the (incoming) video feed from the remote location 115, which is shown to the participant at step 801.

Exemplary Computer Platform

Figure 9:
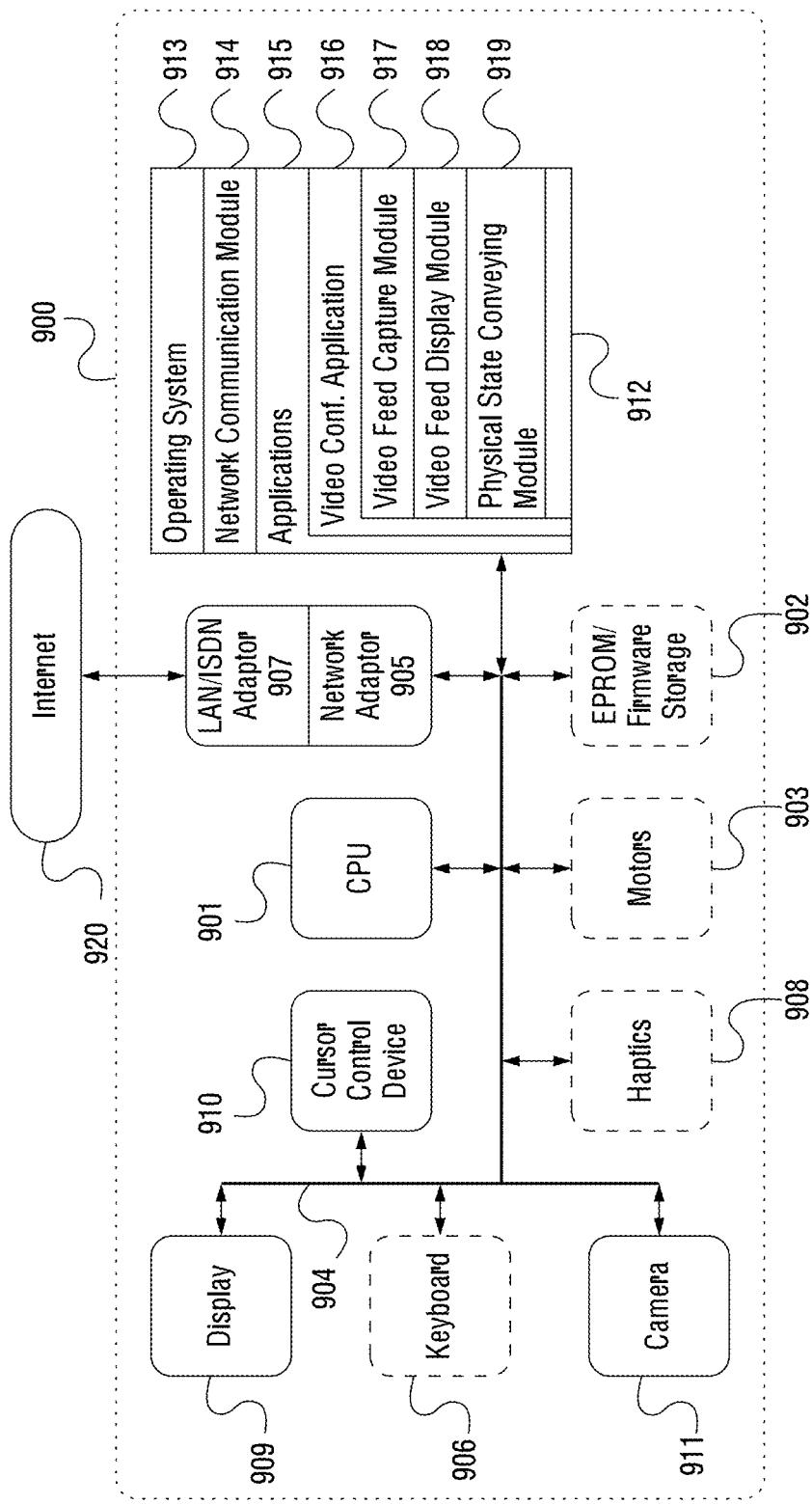
FIG. 9 illustrates an exemplary embodiment of a computerized system for conveying physical state of a remote device.

FIG. 9 illustrates an exemplary embodiment of a computerized system 900 for conveying physical state of a remote device. In one or more embodiments, the computerized system 900 may be implemented within the form factor of a desktop computer or a desktop communication device, well known to persons of skill in the art. In an alternative embodiment, the computerized system 900 may be implemented based on a laptop or a notebook computer, a tablet or a smartphone.

The computerized system 900 may include a data bus 904 or other interconnect or communication mechanism for communicating information across and among various hardware components of the computerized system 900, and a central processing unit (CPU or simply processor) 901 electrically coupled with the data bus 904 for processing information and performing other computational and control tasks. Computerized system 900 also includes a memory 912, such as a random access memory (RAM) or other dynamic storage device, coupled to the data bus 904 for storing various information as well as instructions to be executed by the processor 901. The memory 912 may also include persistent storage devices, such as a magnetic disk, optical disk, solid-state flash memory device or other non-volatile solid-state storage devices.

In one or more embodiments, the memory 912 may also be used for storing temporary variables or other intermediate information during execution of instructions by the processor 901. Optionally, computerized system 900 may further include a read only memory (ROM or EPROM) 902 or other static storage device coupled to the data bus 904 for storing static information and instructions for the processor 901, such as firmware necessary for the operation of the computerized system 900, basic input-output system (BIOS), as well as various configuration parameters of the computerized system 900.

In one or more embodiments, the computerized system 900 may incorporate a display device 909, which may be also electrically coupled to the data bus 904, for displaying various information to a participant of the computerized system 900, such as video feeds described hereinabove. In an alternative embodiment, the display device 909 may be associated with a graphics controller and/or graphics processor (not shown). The display device 909 may be implemented as a liquid crystal display (LCD), manufactured, for example, using a thin-film transistor (TFT) technology or an organic light emitting diode (OLED) technology, both of which are well known to participants of ordinary skill in the art. In various embodiments, the display device 909 may be incorporated into the same general enclosure with the remaining components of the computerized system 900. In an alternative embodiment, the display device 909 may be positioned outside of such enclosure, such as on the surface of a table or a desk. Also provided may be the motors/actuators 903 configured to perform the motions described above as well as haptic devices 908 configured to provide haptic feedback to the participant. The motors/actuators 903 and the haptic devices 908 are also attached to the data bus 904.

In one or more embodiments, the computerized system 900 may incorporate one or more input devices, including cursor control devices, such as a mouse/pointing device 910, such as a mouse, a trackball, a touchpad, or cursor direction keys for communicating direction information and command selections to the processor 901 and for controlling cursor movement on the display 909. This input device typically has two degrees of freedom in two axes, a first axis (e.g., x) and a second axis (e.g., y), that allows the device to specify positions in a plane.

The computerized system 900 may further incorporate the camera 911 for acquiring still images and video of various objects, including the video feeds described herein, as well as a keyboard 906, which all may be coupled to the data bus 904 for communicating information, including, without limitation, images and video, as well as participant commands (including gestures) to the processor 901.

In one or more embodiments, the computerized system 900 may additionally include a communication interface, such as a network adaptor 905 coupled to the data bus 904. The network adaptor 905 may be configured to establish a connection between the computerized system 900 and the Internet 920 using at least a local area network (LAN) and/or ISDN adaptor 907. The network adaptor 905 may be configured to enable a two-way data communication between the computerized system 900 and the Internet 920. The LAN adaptor 907 of the computerized system 900 may be implemented, for example, using an integrated services digital network (ISDN) card or a modem to provide a data communication connection to a corresponding type of telephone line, which is interfaced with the Internet 920 using Internet service provider's hardware (not shown). As another example, the LAN adaptor 907 may be a local area network interface card (LAN NIC) to provide a data communication connection to a compatible LAN and the Internet 920. In an exemplary implementation, the LAN adaptor 907 sends and receives electrical or electromagnetic signals that carry digital data streams representing various types of information.

In one or more embodiments, the Internet 920 typically provides data communication through one or more sub-networks to other network resources, such as remote video-conference systems, which may be implemented using systems similar to the computerized system 900. Thus, the computerized system 900 is capable of accessing a variety of network resources located anywhere on the Internet 920, such as remote media servers, web servers, other content servers as well as other network data storage resources. In one or more embodiments, the computerized system 900 is configured to send and receive messages, media and other data, including application program code, through a variety of network(s) including the Internet 920 by means of the network interface 905. In the Internet example, when the computerized system 900 acts as a network client, it may request code or data for an application program executing on the computerized system 900. Similarly, it may send various data or computer code to other network resources.

In one or more embodiments, the functionality described herein is implemented by computerized system 900 in response to processor 901 executing one or more sequences of one or more instructions contained in the memory 912. Such instructions may be read into the memory 912 from another computer-readable medium. Execution of the sequences of instructions contained in the memory 912 causes the processor 901 to perform the various process steps described herein. In alternative embodiments, hard-wired circuitry may be used in place of or in combination with software instructions to implement the embodiments of the invention. Thus, the described embodiments of the invention are not limited to any specific combination of hardware circuitry and/or software.

The term "computer-readable medium" as used herein refers to any medium that participates in providing instructions to the processor 901 for execution. The computer-readable medium is just one example of a machine-readable medium, which may carry instructions for implementing any of the methods and/or techniques described herein. Such a medium may take many forms, including but not limited to, non-volatile media and volatile media.

Common forms of non-transitory computer-readable media include, for example, a floppy disk, a flexible disk, hard disk, magnetic tape, or any other magnetic medium, a CD-ROM, any other optical medium, punchcards, paper-tape, any other physical medium with patterns of holes, a RAM, a PROM, an EPROM, a FLASH-EPROM, a flash drive, a memory card, any other memory chip or cartridge, or any other medium from which a computer can read. Various forms of computer readable media may be involved in carrying one or more sequences of one or more instructions to the processor 901 for execution. For example, the instructions may initially be carried on a magnetic disk from a remote computer. Alternatively, a remote computer can load the instructions into its dynamic memory and send the instructions over the Internet 920. Specifically, the computer instructions may be downloaded into the memory 912 of the computerized system 900 from the foresaid remote computer via the Internet 920 using a variety of network data communication protocols well known in the art.

In one or more embodiments, the memory 912 of the computerized system 900 may store any of the following software programs, applications or modules:

1. Operating system (OS) 913 for implementing basic system services and managing various hardware components of the computerized system 900. Exemplary embodiments of the operating system 913 are well known to persons of skill in the art, and may include any now known or later developed mobile operating systems.

2. Applications 914 may include, for example, a set of software applications executed by the processor 901 of the computerized system 900, which cause the computerized system 900 to perform certain predetermined functions, such as display the video feed on the display device 909 or convey physical state of a remote device to the participant using the techniques described above. In one or more embodiments, the applications 914 may include an inventive videoconferencing application 915 incorporating the functionality described above.

In one or more embodiments, the inventive videoconferencing application 915 incorporates a video feed capture module 917 for capturing videoconferencing feed using the camera 909, a video feed display module 918 for displaying the received (from remote location) video feed on the display device 909 and a physical state conveying application 919 for conveying physical state of a remote device to the participant in accordance with the embodiments described above.

Finally, it should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The present invention has been described in relation to particular examples, which are intended in all respects to be illustrative rather than restrictive. Those skilled in the art will appreciate that many different combinations of hardware, software, and firmware will be suitable for practicing the present invention. For example, the described software may be implemented in a wide variety of programming or scripting languages, such as Assembler, C/C++, Objective-C, perl, shell, PHP, Java, as well as any now known or later developed programming or scripting language.

Moreover, other implementations of the invention will be apparent to those skilled in the art from consideration of the specification and practice of the invention disclosed herein. Various aspects and/or components of the described embodiments may be used singly or in any combination in the systems and methods for conveying physical state of a remote device. It is intended that the specification and examples be considered as exemplary only, with a true scope and spirit of the invention being indicated by the following claims.

What is claimed is:

1. A computer-implemented method being performed in a computerized system comprising a processing unit, a display device, a network interface and a memory, the computer-implemented method comprising:
    a. receiving, via the network interface, a video feed from a remote device disposed at a remote location;
    b. generating an avatar of a local participant, the avatar of the local participant representing local participant's motion;
    c. overlaying the generated avatar of the local participant over the received video feed based on contents of the received video feed such as to create an appearance of a presence of the local participant in the remote location; and
    d. displaying the received video feed with the overlaid avatar of the local participant to the local participant on the display device.

2. The computer-implemented method of claim 1, wherein the avatar of the local participant is generated using an outgoing second video feed.

3. The computer-implemented method of claim 2, further comprising removing background from the second video feed to obtain a silhouette of the local participant, wherein the avatar of the local participant is generated using the obtained silhouette of the local participant.

4. The computer-implemented method of claim 1, wherein the generated avatar of the local participant is overlaid over the received video feed to minimize occlusion of meaningful content.

5. A computer-implemented method being performed in a computerized system comprising a processing unit, a display device, a network interface and a memory, the computer-implemented method comprising:
    a. receiving, via the network interface, a video feed from a remote device disposed at a remote location;
    b. generating an avatar of a local participant, the avatar of the local participant representing local participant's motion;
    c. overlaying the generated avatar of the local participant over the received video feed based on contents of the received video feed; and
    d. displaying the received video feed with the overlaid avatar of the local participant to the local participant on the display device.

6. The computer-implemented method of claim 5, wherein the avatar of the local participant is generated using an outgoing second video feed.

7. The computer-implemented method of claim 6, further comprising removing background from the second video feed to obtain a silhouette of the local participant, wherein the avatar of the local participant is generated using the obtained silhouette of the local participant.

8. The computer-implemented method of claim 5, wherein the generated avatar of the local participant is overlaid over the received video feed to minimize occlusion of meaningful content.

\* \* \* \* \*